United States Patent Office 2,773,069
Patented Dec. 4, 1956

2,773,069

AMINES

Richard V. Heinzelman, Kalamazoo Township, Kalamazoo County, and Brooke D. Aspergren, Kalamazoo, Mich., assignors to The Upjohn Company, Kalamazoo, Mich., a corporation of Michigan No Drawing. Application November 12, 1952,
Serial No. 320,125

10 Claims. (Cl. 260—326.5)

This invention relates to tertiary aminoketones and, more particularly, to tertiary N-desylamines and to a process for the preparation thereof.

Secondary aminoketones have been conveniently prepared by the condensation of benzoin with primary amines using the procedure set forth by Voigt, J. Prakt. Chem., [2] 34, 2, (1886). Voigt indicated that the process was limited to the preparation of secondary aminoketones, and this observation has been borne out by the subsequent unsuccessful attempts of other investigators to prepare tertiary aminoketones by the use of the Voigt reaction. For example, Cowper and Stevens, J. Chem. Soc., 347 (1940), were unable to condense methylaniline with a benzoin compound even under extreme reaction conditions. More recently, Lutz, Freek and Murphy, J. Am. Chem. Soc., 70, 2015, (1948), employed the Voigt reaction to prepare secondary aminoketones but had to resort to other procedures to prepare tertiary aminoketones. Evidence lending further support to the foregoing is offered by applicants' own unsuccessful attempts to condense benzoin with diethylamine using the reaction conditions set forth by Voigt, in which case the end product of the reaction was the unreacted benzoin.

It is an object of the present invention to prepare tertiary cyclic N-desylamines by a new and novel process. Another object of this invention is to prepare tertiary cyclic N-desylamines in substantially high yields by a simple, direct and relatively economical procedure. Other objects and features of the invention will be apparent to those skilled in the art to which this invention pertains.

It has now been discovered that tertiary cyclic N-desylamines can be prepared by reacting, preferably at elevated temperatures, a cyclic secondary amine wherein the amino nitrogen atom is a member of the ring, such as, for example, a pyrrolidine, piperidine, morpholine, hydroquinoline, or the like, with a selected aromatic ketone such as, for example, benzoin, dimethoxybenzoin, diethoxybenzoin, dipropoxybenzoin, methoxyethoxybenzoin, methoxypropoxybenzoin, or the like, preferably in the presence of an acidic condensing agent such as concentrated hydrochloric acid, zinc chloride, phosphorus trichloride, or phosphorus pentoxide, the latter being especially preferred. The tertiary cyclic N-desylamine obtained by this procedure may be isolated from the reaction mixture by the addition of a water-immiscible organic solvent such as diethylether, benzene, ethyl acetate, or the like, extracting the resulting solution with a dilute aqueous-acid solution, treating the aqueous-acid extract thus-obtained with an alkali, and extracting the desired tertiary cyclic aminoketone with ether. The ether extract is then dried and the solvent removed therefrom by distillation to obtain the desired tertiary cyclic N-desylamine. Similarly, by reacting benzoin with a substituted cyclic secondary amine wherein the amino nitrogen atom is a member of the ring, such as, for example, 2-methylpyrrolidine, 2,3-dimethylpyrrolidine, 2-ethylpiperidine, 2-methylmorpholine, 2-methyldecahydroquinoline, or the like, the corresponding tertiary cyclic N-desylamine, i. e., N-desyl-2-methylpyrrolidine, N-desyl-2,3-dimethylpyrrolidine, N-desyl-2-ethylpiperidine, N-desyl-2-methylmorpholine, N-desyl-2-methyldecahydroquinoline, or the like, is obtained.

The compounds produced by the method of the present invention are represented by the following formula:

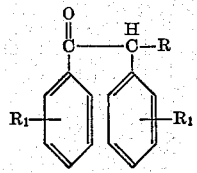

wherein R is a tertiary cyclic amine radical connected to the carbon atom of the above-indicated formula by a ring nitrogen atom and $R_1$ is a member selected from the group consisting of hydrogen and an alkoxy radical, the diphenylethyl ketone radical, attached to the radical identified as R, being referred to herein as the desyl radical.

The process of the present invention is useful in that it provides a simple, direct and relatively economical procedure for the preparation of tertiary cyclic N-desylamines by reacting a cyclic secondary amine wherein the amino nitrogen atom is a member of the ring with a selected aromatic ketone, preferably in the presence of a condensing agent. These tertiary cyclic N-desylamines are useful in the preparation of phenylpyrrolidylethanols, disclosed in copending application Serial Number 320,-121, phenylpiperidylethanols, or the like, which possess bronchodilator activity. Such phenylpyrrolidylethanols, phenylpiperidylethanols, or the like, can be prepared by reduction to a hydroxy group of the keto group in the corresponding N-desylpyrrolidine, N-desylpiperidine, or the like, as with lithium aluminum hydride.

The following examples are illustrative of the process and products of this invention and are not to be construed as limiting.

*Example 1.—N-(para,para'-dimethoxydesyl)-pyrrolidine*

A mixture of 27.2 grams of para-anisoin, 7.1 grams of pyrrolidine, and two grams of phosphorus pentoxide was heated at about 100 degrees centigrade for four hours. After cooling the reaction mixture, 250 milliliters of a one-normal hydrochloric acid solution was added thereto. The acid extract containing the thus-formed N-(para,para'-dimethoxydesyl)-pyrrolidine was decolorized with activated carbon, made alkaline with a dilute aqueous sodium hydroxide solution, and the mixture extracted twice with 200-milliliter portions of diethylether. The ether extracts were combined, dried over anhydrous sodium sulfate and the solvent removed therefrom by distillation to obtain N-(para,para'-dimethoxydesyl)-pyrrolidine.

To convert the free base to its hydrochloride, ten grams of the thus-produced N-(para,para'-dimethoxydesyl)-pyrrolidine was dissolved in about 200 milliliters of ether and mixed with fifty milliliters of an ethanolic solution of hydrogen chloride. The semi-solid which formed was separated by decantation and recrystallized from a mixture of ethanol and ether. The substantially pure N-(para,para'-dimethoxydesyl) - pyrrolidine hydrochloride melted at 225 to 227 degrees centigrade, with decomposition.

*Anal.*—Calc. for $C_{20}H_{24}ClNO_3$: C, 66.38; H, 6.69; Cl, 9.80; N, 3.87. Found: C, 66.53; H, 6.71; Cl, 9.76; N, 4.07.

*Example 2.—N-(ortho,ortho'-dimethoxydesyl)-pyrrolidine*

A mixture of 27.2 grams of ortho-anisoin, 7.1 grams of pyrrolidine, and two grams of phosphorus pentoxide was heated at about 100 degrees centigrade for three hours, cooled, and then extracted with about 200 milliliters of ether. The ether extract was washed twice with 200-milliliter portions of water and then extracted with 200 milliliters of a one-normal aqueous hydrochloric acid solution. The resulting aqueous-acid extract was made alkaline with a dilute aqueous sodium hydroxide solution and extracted with 200 milliliters of ether. The ether extract was dried over anhydrous sodium sulfate and the solvent removed therefrom by distillation to obtain N-(ortho,ortho'-dimethoxydesyl)-pyrrolidine in solid form.

To convert the free base to its hydrochloride, ten grams of the thus-produced N-(ortho,ortho'-dimethoxydesyl)-pyrrolidine was dissolved in about 200 milliliters of ethyl acetate and mixed with fifty milliliters of an ethanolic solution of hydrogen chloride. The N-(ortho,ortho'-dimethoxydesyl)-pyrrolidine hydrochloride thus-formed was recovered from the alcoholic solution in the form of a semi-solid.

The N-(ortho,ortho'-dimethoxydesyl)-pyrrolidine hydrochloride thus-obtained was converted to the free base by treatment with sodium hydroxide, extracted with ether, dried, and then reduced with lithium aluminum hydride to obtain the corresponding alcohol, $\alpha,\beta$-di-(ortho-methoxyphenyl)-$\beta$-(pyrrolidyl-1)-ethanol. On treating the thus-obtained $\alpha,\beta$-di-(ortho-methoxyphenyl)-$\beta$-(pyrrolidyl-1)-ethanol with an ethanolic solution of hydrogen chloride, the corresponding $\alpha,\beta$-di-(ortho-methoxyphenyl)-$\beta$-(pyrrolidyl-1)-ethanol hydrochloride, melting at 227 to 228 degrees centigrade, is obtained.

*Anal.*—Calc. for $C_{20}H_{26}ClNO_3$: C, 66.01; H, 7.20; Cl, 9.74; N, 3.85. Found: C, 66.26; H, 6.96; Cl, 9.68; N, 4.10.

*Example 3.—N-(meta,meta'-dimethoxydesyl)-pyrrolidine*

Following the procedure set forth in Example 1 supra except for the substitution of para-anisonin by meta-anisoin, N-(meta,meta'-dimethoxydesyl)-pyrrolidine is obtained.

*Example 4.—N-desylpyrrolidine*

Following the procedure set forth in Example 1 supra except for the substitution of para-anisoin by benzoin, N-desylpyrrolidine is obtained.

By reacting N-desylpyrrolidine with an alcoholic solution of hydrogen chloride, the corresponding N-desylpyrrolidine hydrochloride is obtained.

Similarly, by reacting N-desylpyrrolidine with alcoholic solutions of other selected acids such as, for example, sulfuric acid, benzoic acid, or the like, the corresponding acid addition salts of N-desylpyrrolidine are obtained such as, for example, N-desylpyrrolidine sulfate, N-desylpyrrolidine benzoate, or the like.

*Example 5.—N-desyl-2-methylpyrrolidine*

Following the procedure set forth in Example 1 supra except for the substitution of pyrrolidine by 2-methylpyrrolidine, N-desyl-2-methylpyrrolidine is obtained.

*Example 6.—N-desylpiperidine*

A mixture of 106.2 grams (0.5 mole) of benzoin, 46.8 grams (0.55 mole) of piperidine, and five grams of phosphorus pentoxide was heated at about 100 degrees centigrade with stirring for five hours. To the reaction mixture was added 200 milliliters of benzene and 200 milliliters of an aqueous solution containing 12.5 percent by weight of hydrochloric acid. Thirty-five grams of benzoin were removed by filtration from the resulting organic layer, the latter then being discarded. The aqueous-acid solution was made alkaline by the addition of a dilute sodium hydroxide solution, thereby precipitating 53.5 grams of N-desylpiperidine, a yellow-white solid which melted at 80 to 84 degrees centigrade.

*Anal.*—Calc. for $C_{19}H_{21}NO$: C, 81.68; H, 7.57; N, 5.01. Found: C, 81.85; H, 7.64; N, 5.02.

To convert the free base to its hydrochloride, the thus-produced N-desylpiperidine was dissolved in 150 milliliters of ethyl acetate and mixed with a slight excess of an ethanolic solution of hydrogen chloride. The resulting gummy precipitate was converted to a solid by rubbing with a glass rod and recrystallized from an ethanol-ether mixture to obtain N-desylpiperidine hydrochloride having a melting point of 236 to 238 degrees centigrade.

*Anal.*—Calc. for $C_{19}H_{22}ClNO$: C, 72.25; H, 7.02; Cl, 11.23; N, 4.43. Found: C, 72.37; H, 7.17; Cl, 11.03; N, 4.72.

Similarly, by reacting N-desylpiperidine with alcoholic solutions of other selected acids such as, for example, sulfuric acid, benzoic acid, or the like, the corresponding acid addition salts of N-desylpiperidine are obtained such as, for example, N-desylpiperidine sulfate, N-desylpiperidine benzoate, or the like.

*Example 7.—N-desylmorpholine*

A mixture of 106.2 grams (0.5 mole) of benzoin, 48 grams (0.55 mole) of morpholine, and five grams of phosphorus pentoxide was heated at about 100 degrees centigrade for five hours. The resulting slurry was cooled, 250 milliliters of ether added to dissolve the solids, and the desired product, N-desylmorpholine, extracted by the addition of 250 milliliters of an aqueous hydrochloric acid solution containing ten percent by weight of hydrochloric acid. The acid-extract containing N-desylmorpholine was made alkaline with a dilute aqueous sodium hydroxide solution and the free base extracted with ether. The ether extract containing N-desylmorpholine was dried over anhydrous sodium sulfate and the solvent removed therefrom by distillation to obtain the desired N-desylmorpholine.

To convert the free base to its hydrochloric, the thus-produced N-desylmorpholine was dissolved in 250 milliliters of ethyl acetate and mixed with a slight excess of an ethanolic solution of hydrogen chloride to obtain the desired N-desylmorpholine hydrochloride, having a melting point of 198 to 200 degrees centigrade.

*Example 8.—N-desyldecahydroquinoline*

By reacting a mixture of 106.12 grams (0.5 mole) of benzoin, 73.3 grams (0.55 mole) of decahydroquinoline, and five grams of phosphorus pentoxide in the manner described in Example 1 supra, N-desyldecahydroquinoline is obtained.

Similarly, by reacting a mixture of benzoin and tetrahydroquinoline in the presence of phosphorus pentoxide, the corresponding N-desyltetrahydroquinoline is obtained.

Following the procedure set forth above, other tertiary cyclic N-desylamines may be prepared such as, for example, N-(para,para'-diethoxydesyl)-pyrrolidine, N-(ortho,ortho'-diethoxydesyl)-pyrrolidine, N-(meta,meta'-diethoxydesyl)-pyrrolidine, N-(para,para'-dipropoxydesyl)-pyrrolidine, N-(ortho,para'-dipropoxydesyl)-pyrrolidine, N-(para,para'-dibutoxydesyl)-pyrrolidine, N-(para-methoxy-para'-ethoxydesyl)-pyrrolidine, N-(para,para'-diamyloxydesyl)-pyrrolidine, N-(para,para'-dihexyloxydesyl)-pyrrolidine, N-(para,para'-diheptyloxydesyl)-pyrrolidine, N-(para,para'-dioctyloxydesyl)-pyrrolidine, N-(para,para'-diethoxydesyl)-piperidine, N-(ortho,ortho'-diethoxydesyl)-piperidine, N-(meta,meta'-diethoxydesyl)-piperidine, N-(para,para'-dipropoxydesyl)-piperidine, N-(ortho,para'-dipropoxydesyl)-piperidine, N-(para,para'-dibutoxydesyl)-piperidine, N-(para-methoxy-para'-ethoxydesyl)-piperidine, N-(para,para'-diamyloxydesyl)-piperidine, N-(para,para'-dihexyloxydesyl)-piperidine, N-(para,para'-diheptyloxydesyl)-piperidine, N-(para,para'-dioctyloxydesyl)-piperidine, N-(para,para'-diethoxydesyl)-morpholine, N-(ortho,ortho'-diethoxydesyl)-morpholine, N-(meta,meta'-diethoxydesyl)-morpholine, N-(para,para'-dipropoxydesyl)-morpholine, N-(para,para'-dibutoxydesyl)-morpholine, N-(para-methoxy-para'-ethoxydesyl)-morpholine, N-(ortho,ortho'-diethoxydesyl)-decahydroquinoline, N-(meta,meta'-diethoxydesyl)-decahydroquinoline, N-(para,para'-dipropoxydesyl)-decahydroquinoline, N - (para,para' - dibutoxydesyl) - decahydroquinoline, N - (para - methoxy - para' - ethoxydesyl)-decahydroquinoline, acid addition salts of the foregoing free amine bases, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the preparation of tertiary N-desylamines of the formula:

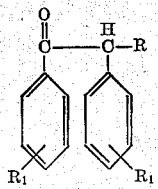

wherein R is a tertiary cyclic amino radical selected from the group consisting of pyrrolidino, piperidino, morpholino, decahydroquinolino radicals, and lower-alkyl substituted pyrrolidino, piperidino, morpholino and decahydroquinolino radicals and $R_1$ is a member selected from the group consisting of hydrogen and a lower alkoxy radical, which includes the step of reacting at an elevated temperature and in the presence of an acidic condensing agent, an aromatic ketone of the formula:

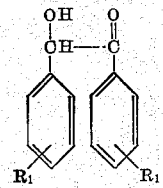

wherein $R_1$ is a member selected from the group consisting of hydrogen and a lower alkoxy radical, with a cyclic secondary amine selected from the group consisting of pyrrolidine, piperidine, morpholine, decahydroquinoline, and lower-alkyl substituted pyrrolidines, piperidines, morpholines and decahydroquinolines, to obtain the corresponding desired tertiary N-desylamine.

2. A process for the preparation of tertiary N-desylamines of the formula:

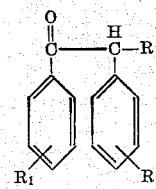

wherein R is a tertiary cyclic amino radical selected from the group consisting of pyrrolidino, piperidino, morpholino and decahydroquinolino radicals, and lower-alkyl substituted pyrrolidino, piperidino, morpholino, and decahydroquinolino radicals and $R_1$ is a member selected from the group consisting of hydrogen and a lower-alkoxy radical, which includes the steps of reacting at an elevated temperature and in the presence of phosphorus pentoxide an aromatic ketone of the formula:

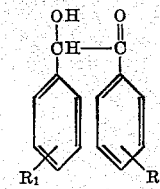

wherein $R_1$ is a member selected from the group consisting of hydrogen and a lower alkoxy radical, with a cyclic secondary amine selected from the group consisting of pyrrolidine, piperidine, morpholine, dechaydroquinoline, and lower-alkyl substituted pyrrolidines, piperidines, morpholines and decahydroquinolines, to obtain the corresponding desired tertiary N-desylamine.

3. A process for the preparation of N-di-lower-alkoxydesylpyrrolidine which comprises reacting, at an elevated temperature and in the presence of a phosphorus pentoxide, pyrrolidine and an aromatic ketone of the formula:

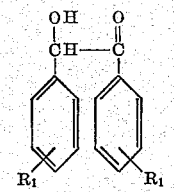

wherein $R_1$ is a lower-alkoxy radical, to form the desired N-di-lower-alkoxydesylpyrrolidine.

4. A process for the preparation of an N-di-lower-dialkoxydesylpyrrolidine which comprises reacting, at an elevated temperature and in the presence of an acidic condensing agent, pyrrolidine and an aromatic ketone of the formula:

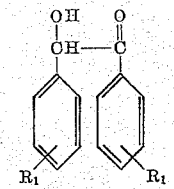

wherein $R_1$ is a lower alkoxy radical to form the desired N-di-lower-dialkoxydesylpyrrolidine.

5. A process for the preparation of an N-dimethoxydesylpyrrolidine which comprises reacting, at an elevated temperature and in the presence of phosphorus pentoxide anisoin and pyrrolidine to form the desired N-dimethoxydesylpyrrolidine.

6. A process for the preparation of N-(para,para'-dimethoxydesyl)-pyrrolidine which comprises reacting, at an elevated temperature and in the presence of phosphorus pentoxide para-anisoin and pyrrolidine to form the desired N-(para,para'-dimethoxydesyl)-pyrrolidine.

7. A process for the preparation of N-desylpyrrolidine which comprises reacting, at an elevated temperature and in the presence of phosphorus pentoxide, benzoin and pyrrolidine to form the desired N-desylpyrrolidine.

8. A process for the preparation of N-(ortho,ortho'-dimethoxydesyl)-pyrrolidine which comprises reacting, at an elevated temperature and in the presence of phosphorus pentoxide, ortho-anisoin and pyrrolidine to form the desired N-(ortho,ortho'-dimethoxydesyl)-pyrrolidine.

9. A process for the preparation of N-(meta,meta'-dimethoxydesyl)-pyrrolidine which comprises reacting, at an elevated temperature and in the presence of phosphorus pentoxide, meta-anisoin and pyrrolidine to form the desired N-(meta,meta'-dimethoxydesyl)-pyrrolidine.

10. A process for the preparation of N-desyl-2-methylpyrrolidine which comprises reacting, at an elevated temperature, and in the presence of phosphorus pentoxide, benzoin and 2-methylpyrrolidine to form the desired N-desyl-2-methylpyrrolidine.

References Cited in the file of this patent

FOREIGN PATENTS

| | | |
|---|---|---|
| 667,356 | Germany | Nov. 9, 1938 |
| 671,786 | Germany | Feb. 13, 1939 |

OTHER REFERENCES

Lutz et al.: JACS, vol. 70, pp. 2015–23 (1948).
Goodson et al.: JACS, vol. 71, pp. 3219–21 (1949).